(12) United States Patent
Reising

(10) Patent No.: US 11,472,637 B1
(45) Date of Patent: Oct. 18, 2022

(54) MATERIAL TRANSFER SYSTEM

(71) Applicant: Kirk Reising, Evansville, IN (US)

(72) Inventor: Kirk Reising, Evansville, IN (US)

( * ) Notice: Subject to any disclaimer, the term of this patent is extended or adjusted under 35 U.S.C. 154(b) by 0 days.

(21) Appl. No.: 17/858,155

(22) Filed: Jul. 6, 2022

(51) Int. Cl.
*B65G 51/04* (2006.01)
*B65G 53/24* (2006.01)
(52) U.S. Cl.
CPC ............ *B65G 53/24* (2013.01); *B65G 51/04* (2013.01)
(58) Field of Classification Search
None
See application file for complete search history.

(56) References Cited

U.S. PATENT DOCUMENTS

| | | | | |
|---|---|---|---|---|
| 4,087,134 A | * | 5/1978 | Jordan | B65G 53/26 406/146 |
| 5,147,152 A | * | 9/1992 | Link | B65G 53/24 406/33 |
| 5,791,073 A | * | 8/1998 | Palmer | E02F 5/003 406/173 |

* cited by examiner

*Primary Examiner* — William R Harp
(74) *Attorney, Agent, or Firm* — Shane Cortesi

(57) ABSTRACT

A material transfer system is described. In some embodiments, the system may include a coupler, a destination inlet and source outlet and the coupler may include an opening to allow air to be drawn into the system. The opening may be covered by a screen and a moveable sleeve may be used to at least partially cover the opening.

14 Claims, 11 Drawing Sheets

MATERIAL TRANSFER SYSTEM

BACKGROUND

Technical Field

The present invention relates to a material transfer system for transferring pellets and other materials from a source to a destination.

Background of the Invention

Vacuum-based systems for transferring contents from one container (e.g., a rail car) to another (e.g., a trailer) are known in the art.

For example, many trains and trucks transfer bulk granular materials such as food and chemicals in large vacuum tanks. During the loading and unloading process, pneumatic pumps transfer such materials through pipes and other hoses under vacuum. However, in order for a vacuum to be effective, air must be introduced to allow the material to move. Conventional methods of introducing air are often inadequate or introduce air at the wrong point in the system. As such, material does not transfer expeditiously. Accordingly, there is a need for systems that allow for controlled air flow to be introduced at any point along a vacuum transfer line to help facilitate material transfer.

SUMMARY OF THE INVENTION

The present disclosure provides material transfer systems, vacuum couplers, and methods of using same as described herein.

In some embodiments, the present disclosure provides a method of introducing air to aid the transfer of a load from a source container to a destination container comprising one or more of the steps of: a) providing a source container comprising a load; b) providing a source outlet in gaseous communication with the source container; c) providing a coupler that may have an open front end, an open rear end, a length extending from the open front end to the open rear end, a generally hollow interior extending from the open front end to the open rear end, a sidewall, at least one opening in the sidewall between the open front end and the open rear end and configured to allow air to enter the generally hollow interior, and a screen configured to cover the opening; d) providing a destination container; e) providing a destination inlet in gaseous communication with the destination container; f) connecting the coupler open front end to the source outlet and the coupler open rear end to the destination inlet; and/or g) using a pump to transfer the load from the source container, through the source outlet, through the generally hollow interior of the coupler, through the destination inlet and into the destination container. Optionally, step g) comprises using the pump to create an air pressure gradient between the source container and the destination container in which the pressure is lower in the destination container than in the source container, the pressure gradient causing the load to transfer from the source container, through the source outlet, through the generally hollow interior of the coupler, through the destination inlet, and into the destination container. Optionally, the method further comprises drawing air through the at least one opening in the sidewall during step g). Optionally, the at least one opening is between about 2 inches and about 3 inches in width. Optionally, the pump is located rearwardly relative to the coupler open rear end. Optionally, the pump is a pneumatic pump. Optionally, the destination container is a vacuum tank. Optionally, the load comprises pellets.

Optionally, the coupler further comprises a moveable sleeve configured to rotate relative to the sidewall and at least partially cover the at least one opening. Optionally, the sidewall is generally cylindrical in shape and encircles the generally hollow interior. Optionally, the coupler comprises a handle attached to the moveable sleeve and extending outwardly from the generally hollow interior. Optionally, the sidewall is located between the moveable sleeve and the generally hollow interior. Optionally, the moveable sleeve is comprised of a sleeve tube that encircles the sidewall. Optionally, the moveable sleeve comprises a sleeve opening. Optionally, the sleeve opening has an open position in which the sleeve opening is aligned with the sidewall opening and the sleeve does not cover the sidewall opening and a closed position in which the sleeve opening is not aligned with the sidewall opening and the sleeve at least partially covers the sidewall opening. Optionally, the moveable sleeve is comprised of a sleeve tube that encircles the sidewall and an outer collar that at least partially encircles the sleeve tube. Optionally, the sleeve opening extends through the sleeve tube and the outer collar. Optionally, the screen is sandwiched between the sleeve tube and the outer collar. Optionally, the sleeve tube comprises a sleeve tube opening, wherein the outer collar comprises an outer collar opening. Optionally, the sleeve opening, and the outer collar opening are aligned. Optionally, the screen is sandwiched between the sleeve tube opening and the outer collar opening. Optionally, the outer collar comprises a protrusion extending away from the sleeve tube. Optionally, the coupler further comprises an internal tube comprising the sidewall. Optionally, the internal tube is encircled by the sleeve tube. Optionally, the internal tube is comprised of steel and the sleeve tube and the outer collar are comprised of plastic. Optionally, the outer collar is a partial cylinder. Optionally, the coupler further comprises a fastener removably attaching the outer collar to the sleeve tube. Optionally, at least one of the coupler open rear end and the coupler open forward end comprises a coupler fastener. Optionally, at least one of the coupler open rear end and the coupler open forward end comprises a cam lock. Optionally, step f) comprises connecting the coupler open front end to the source outlet and/or the coupler open rear end to the destination inlet using one or more hoses. Optionally, the pump is a pneumatic pump. Optionally, the destination container is a vacuum tank. Optionally, the load comprises pellets.

In still further embodiments, the present disclosure provides a method of introducing air to aid the transfer of a load from a source container to a destination container comprising one or more of the steps of: a) providing a source container comprising a load; b) providing a source outlet in gaseous communication with the source container; c) providing a coupler having an open front end, an open rear end, a length extending from the open front end to the open rear end, a generally hollow interior extending from the open front end to the open rear end, a sidewall, and at least one valve in the sidewall between the open front end and the open rear end and configured to allow air to enter the generally hollow interior; d) providing a destination container; e) providing a destination inlet in gaseous communication with the destination container; f) connecting the coupler open front end to the source outlet and the coupler open rear end to the destination inlet; and/or g) using a pump to transfer the load from the source container, through the source outlet, through the generally hollow interior of the coupler, through the destination inlet, and into the destination container. Optionally, step g) comprises using the pump to create an air pressure gradient between the source container and the destination container in which the pressure is lower in the destination container than in the source container, the pressure gradient causing the load to transfer from the source container, through the source outlet, through the generally hollow interior of the coupler, through the destination inlet, and into the destination container. Optionally, the method further comprises drawing air through the at least one opening in the sidewall during step g). Optionally, the pump is located rearwardly relative to the coupler open rear end. Optionally, at least one of the coupler open rear end and the coupler open forward end comprises a fastener. Optionally, at least one of the coupler open rear end and the coupler open forward end comprises a cam lock. Optionally, step f) comprises connecting the coupler open front end to the source outlet and/or the coupler open rear end to the destination inlet using one or more hoses. Optionally, the pump is a pneumatic pump. Optionally, the destination container is a vacuum tank. Optionally, the load comprises pellets.

BRIEF DESCRIPTION OF THE DRAWINGS

in FIG. 2, the sidewall opening is in the fully open position.

DETAILED DESCRIPTION

Figure 1:
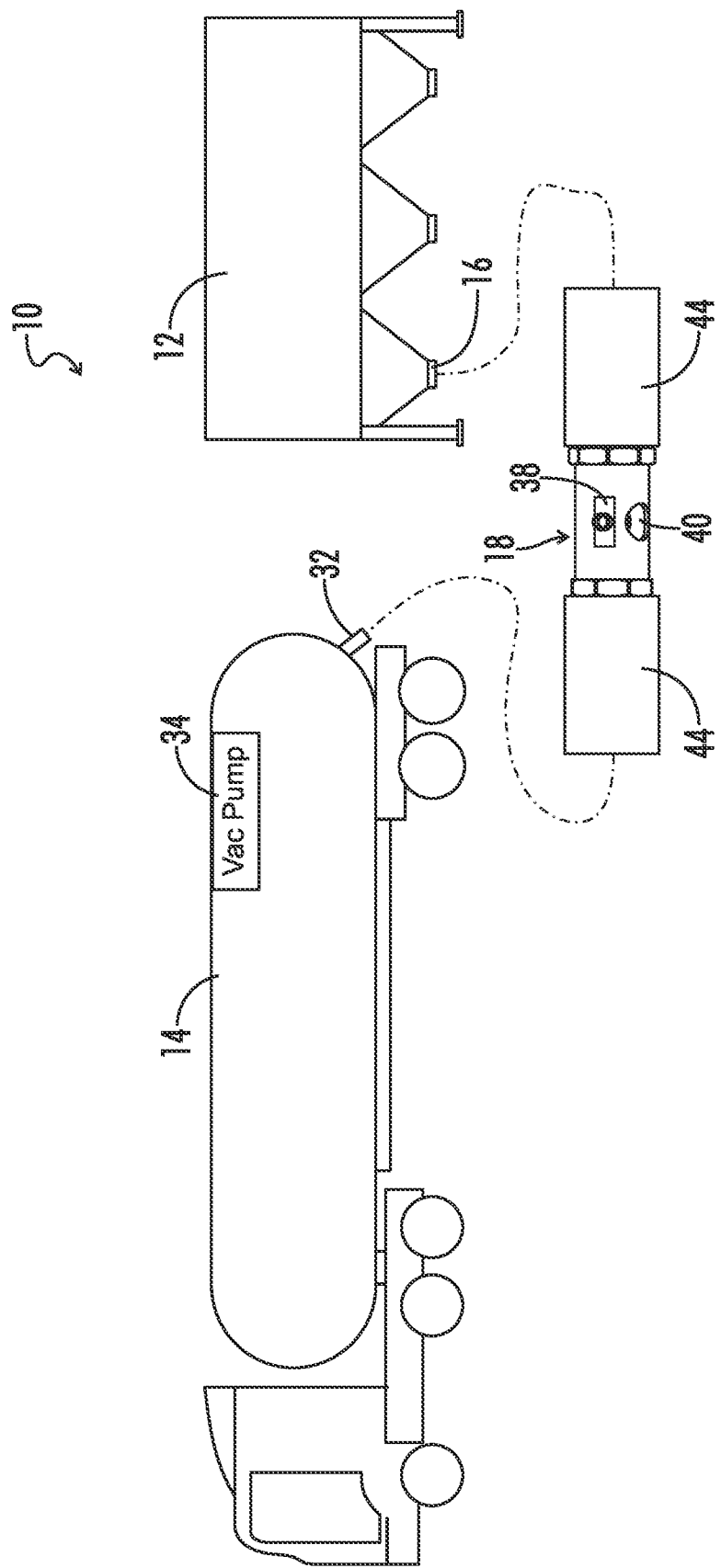
FIG. 1 illustrates a side schematic view of a material transfer system of one embodiment of the present invention.
Figure 2:
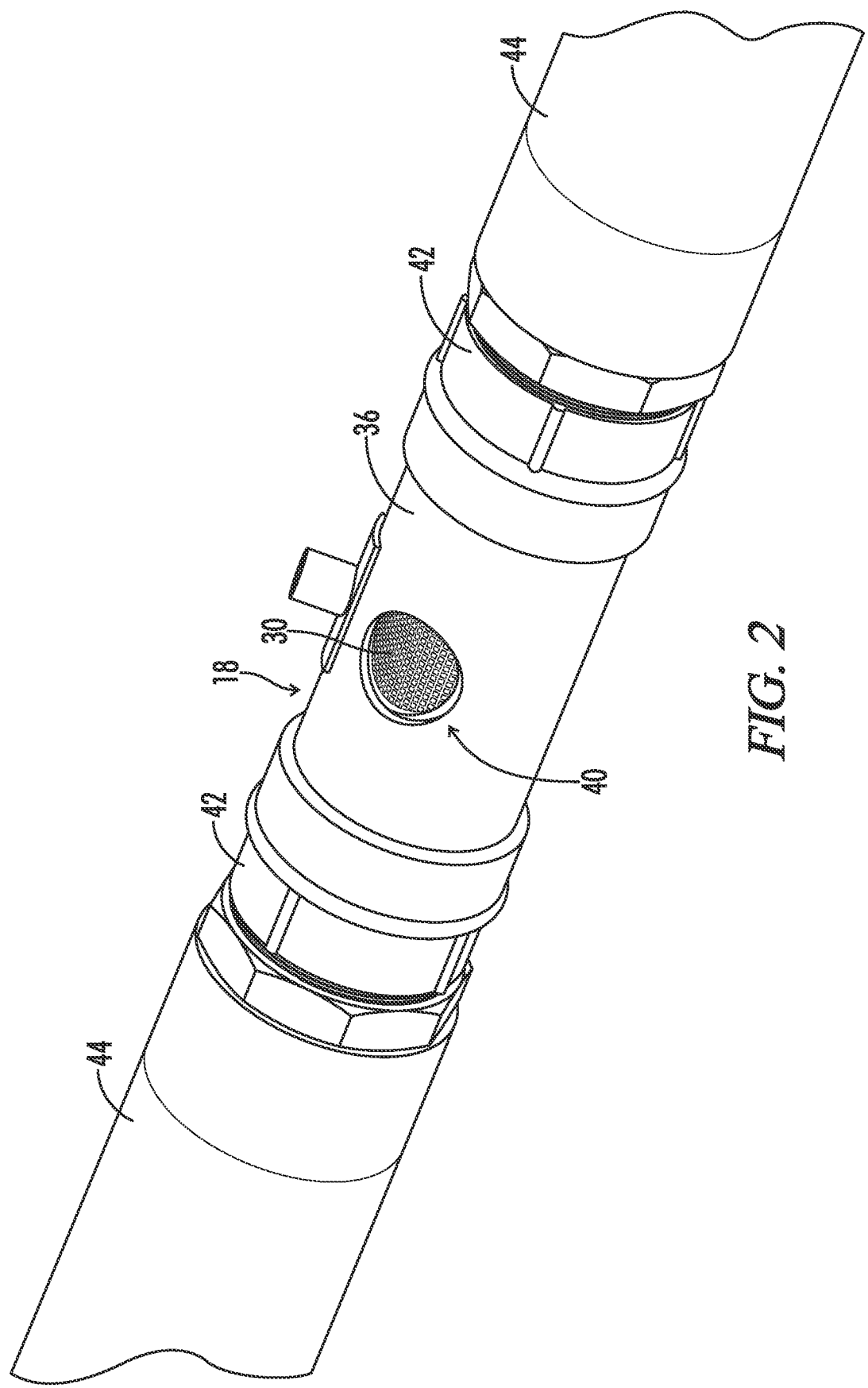
FIG. 2 illustrates a side perspective view of a coupler of one embodiment of the present invention having a front end connected to a first hose and a rear end connected to a second hose, which is connected to a destination inlet.
Figure 3:
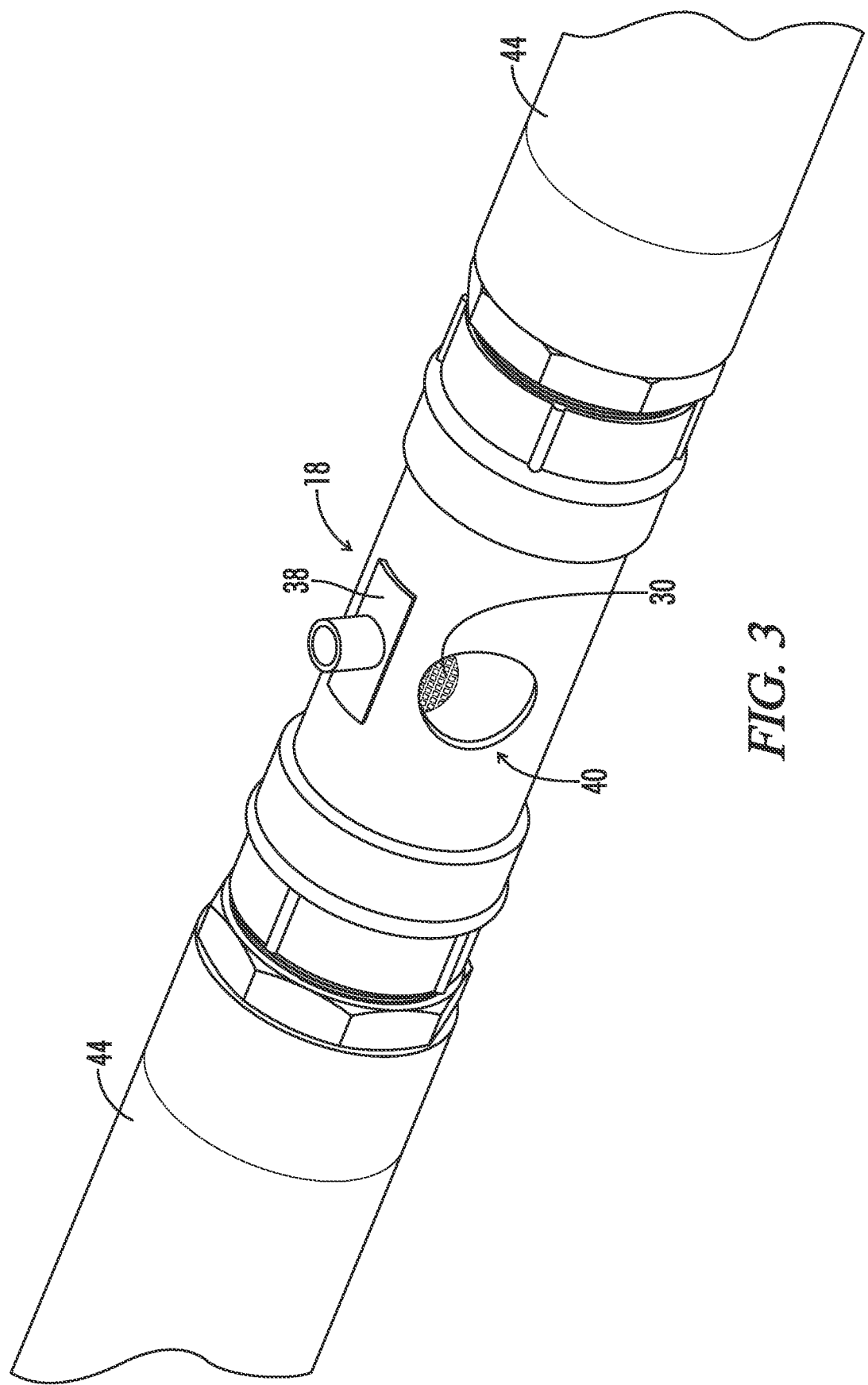
FIG. 3 illustrates a side perspective view of the coupler and hoses of FIG. 2 with the sidewall opening in the partially open position.
Figure 4:
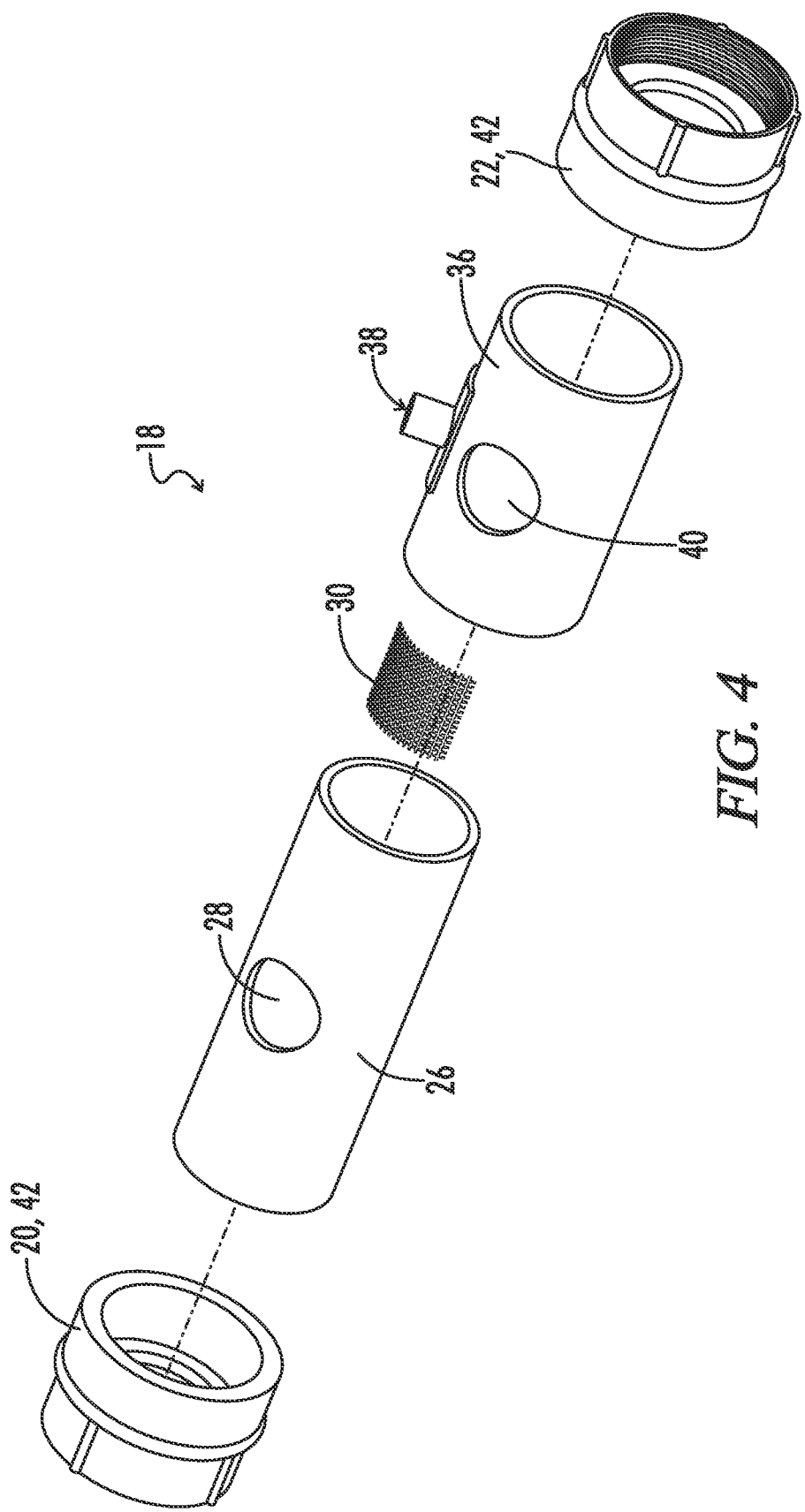
FIG. 4 illustrates a side exploded view of the coupler of FIG. 2.
Figure 5A:
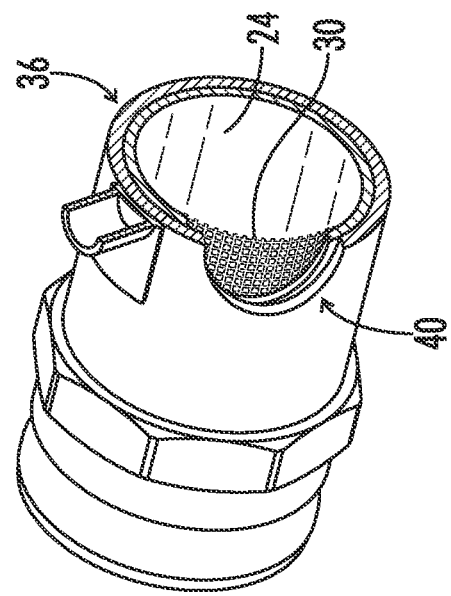
FIG. 5A illustrates a cross-sectional view of the coupler in FIG. 2, taken along line 5A-5A of FIG. 5.
Figure 5:
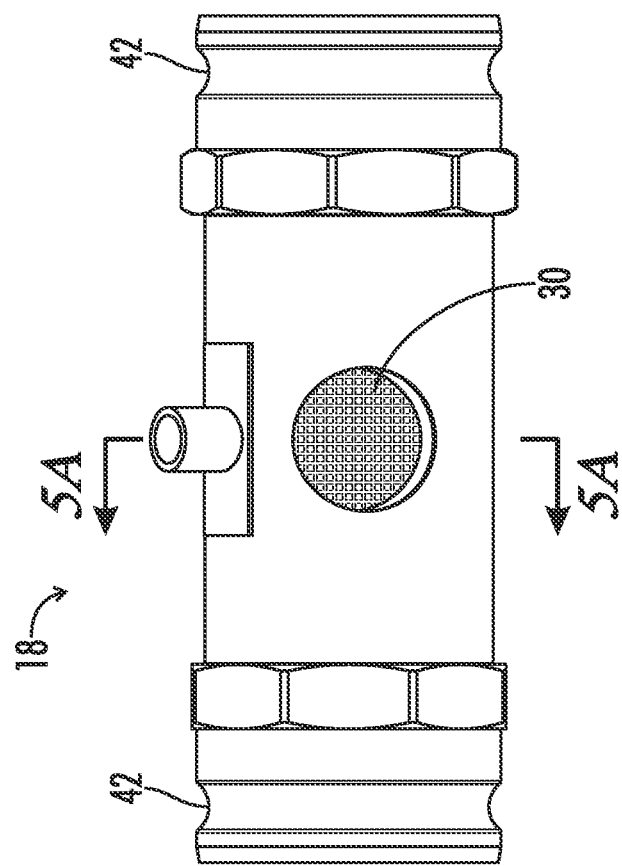
FIG. 5 illustrates a side elevation view of the coupler of FIG. 2.

With reference to FIGS. 1-12 the present disclosure provides a material transfer system designated by the numeral 10. In the drawings, not all reference numbers are included in each of the drawings for the sake of clarity. FIGS. 1-12 are drawn generally to scale, however, it will be appreciated that other dimensions are possible.

Without being bound to any particular theory, in some embodiments, the present disclosure relates to positioning an air valve between a source container 12 and a destination container 14 in a suction-based system to selectively feed air into the system and aid material transfer. As explained in greater detail below, the air valve may be in the form of a coverable coupler sidewall opening 28.

More particularly, with reference to FIGS. 1-12, the present disclosure provides a method of introducing air to aid the transfer of a load from a source container 12 to a destination container 14. In some embodiments, the method may include one or more of the following steps: a) providing a source container 12 comprising a load; b) providing a source outlet 16 in gaseous communication with the source container 12; c) providing a coupler 18 that includes one or more of the following: an open front end 20, an open rear end 22, a length extending from the open front end 20 to the open rear end 22, a generally hollow interior 24 extending from the open front end 20 to the open rear end 22, a sidewall 26, at least one opening 28 in the sidewall 26 between the open front end 20 and the open rear end 22 and configured to allow air to enter the generally hollow interior 24, and/or a screen 30 configured to cover the opening 28; d) providing a destination container 14; e) providing a destination inlet 32 in gaseous communication with the destination container 14; f) connecting the coupler open front end 20 to the source outlet 16 and the coupler open rear end 22 to the destination inlet 32; and/or g) using a pump 34 to transfer the load from the source container 12, through the source outlet 16, through the generally hollow interior of the coupler 24, through the destination inlet 32 and into the destination container 14. The screen 30 may function to prevent the load from escaping through the sidewall opening 28 during the load transfer process (i.e., step g)).

Optionally, step g) comprises using the pump 34 to create an air pressure gradient between the source container 12 and the destination container 14 in which the pressure is lower in the destination container 14 than in the source container 12 (e.g., a vacuum), the pressure gradient causing the load to transfer from the source container 12, through the source outlet 16, through the generally hollow interior of the coupler 24, through the destination inlet 32 and into the destination container 14.

Optionally, the method further comprises drawing air through the at least one opening in the sidewall 28 during step g).

Optionally, the at least one opening 28 is between about 2 inches and about 3 inches in width/diameter.

Optionally, as shown in FIG. 1, the pump 34 is located rearwardly relative to the coupler open rear end 22.

Optionally, as shown in FIGS. 1-12, the coupler 18 further comprises a moveable sleeve 36 configured to rotate relative to the sidewall 26 and at least partially cover the at least one opening 28. Optionally, the sidewall 26 is generally cylindrical in shape and encircles the generally hollow interior 24 (e.g., the sidewall 26 has a circular cross-section).

In some embodiments, as shown in FIGS. 1-7, the sidewall 26 is located between the moveable sleeve 36 and the generally hollow interior 24 and the sleeve 36 is in the form of an outer tube that encircles the sidewall 26. Optionally, as shown in FIGS. 1-7, the coupler 18 comprises a handle 38 attached to the moveable sleeve 36 and extending outwardly from the generally hollow interior 24. Optionally, as shown in FIGS. 1-7, the moveable sleeve 36 comprises a sleeve opening 40. Optionally, the sleeve opening 40 has an open position in which the sleeve opening 40 is aligned with the sidewall opening 28 (and the moveable sleeve 36 does not cover the sidewall opening 28) and a closed position in which the sleeve opening 40 is not aligned with the sidewall opening 28 (and the moveable sleeve 36 at least partially covers the sidewall opening 28). Without being bound by any particular theory, the moveable sleeve 36 may be used to regulate the amount of air that is drawn into the system.

Figure 12:
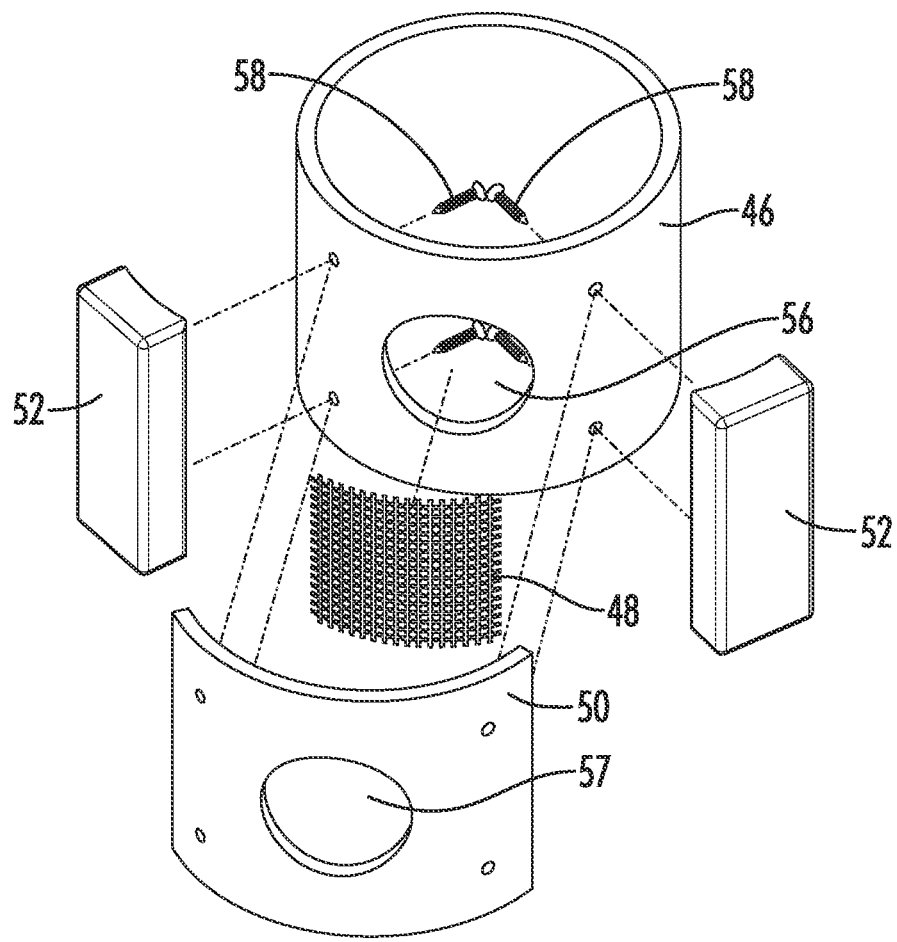
FIG. 12 illustrates a side perspective exploded view of the moveable sleeve of FIG. 11.

Another embodiment of a moveable sleeve 38 is shown in FIGS. 8-12. Optionally, as shown in FIGS. 8-12, the moveable sleeve 38 is comprised of a sleeve tube 46 that encircles the sidewall 26 and an outer collar 50 that at least partially encircles the sleeve tube 46. Optionally, as shown in FIGS. 8-12, the sleeve opening 40 extends through the sleeve tube 46 and the outer collar 50. In other words, preferably, the sleeve tube 46 comprises a sleeve tube opening 56 that is aligned with an outer collar opening 57. Preferably, the screen 48 covers the sleeves opening 40. For example, as best seen in FIG. 12, preferably the screen 48 is sandwiched between the sleeve tube 46 and the outer collar 50, more particularly between the sleeve tube opening 56 and the outer collar opening 57. Optionally, the outer collar 50 comprises a protrusion 52 extending away from the sleeve tube 46 and acting as a handle for turning the moveable sleeve 38. In the embodiment of FIGS. 8-12, the sleeve tube 46 and outer collar 50 are attached (preferably removably attached) via sleeve fasteners 58 and the sleeve tube 46 and outer collar 50 rotate relative to an internal tube 60 (best shown in FIG. 10) comprising the sidewall 26. Optionally, the sleeve fasteners 58 are removable to allow the screen 48 to be replaced. Optionally, the sleeve tube 46 encircles the internal tube 60. Optionally, the internal tube 60 is comprised of steel and the sleeve tube 46 and/or outer collar 50 are comprised of plastic. Optionally, as shown in FIGS. 8-12, the outer collar 50 is partially cylindrical.

Figure 6:
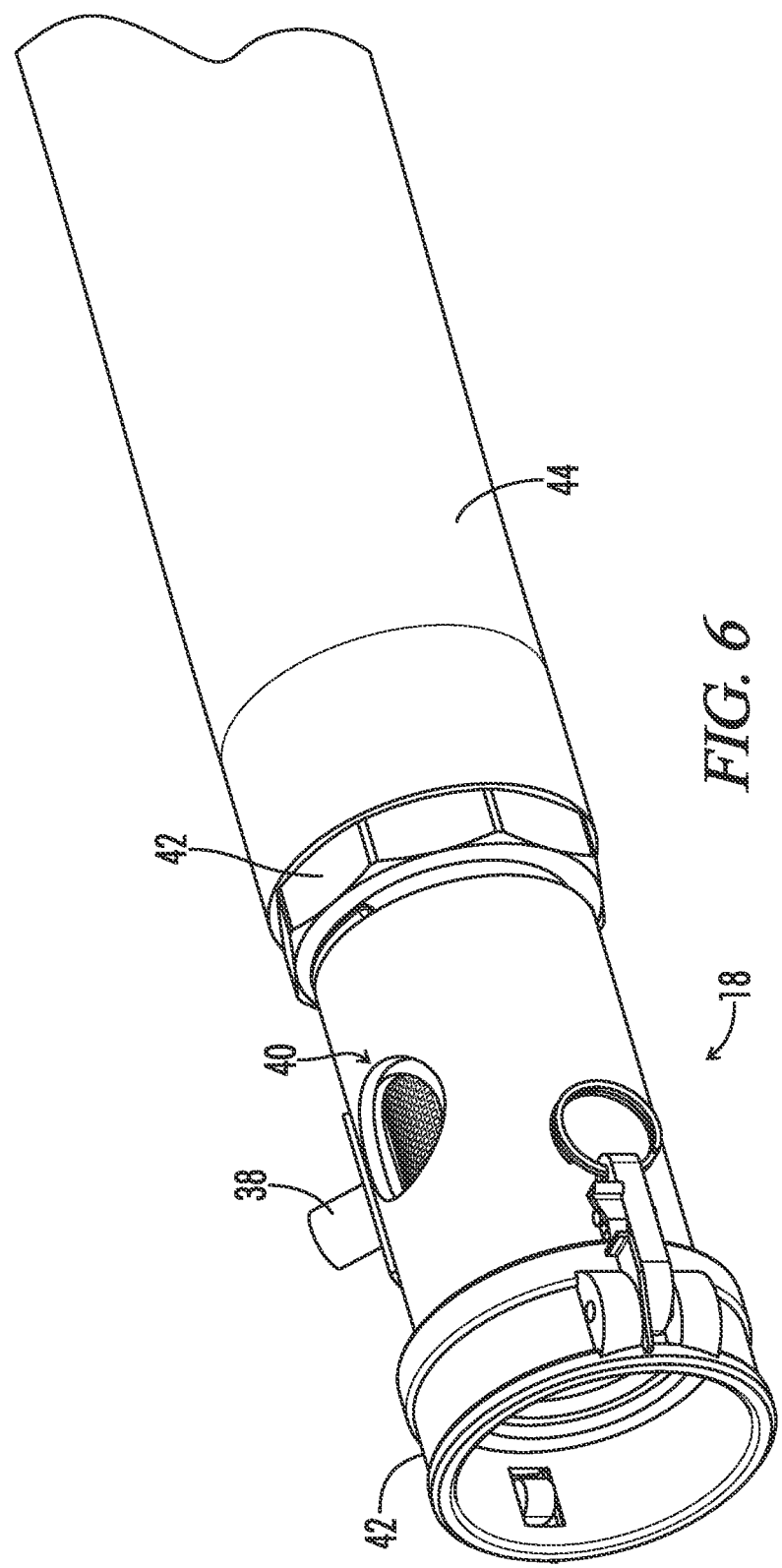
FIG. 6 illustrates a side perspective view of a coupler of another embodiment of the present invention; the coupler has a front end connected to a hose, and a rear end is connected to a cam lock.
Figure 7:
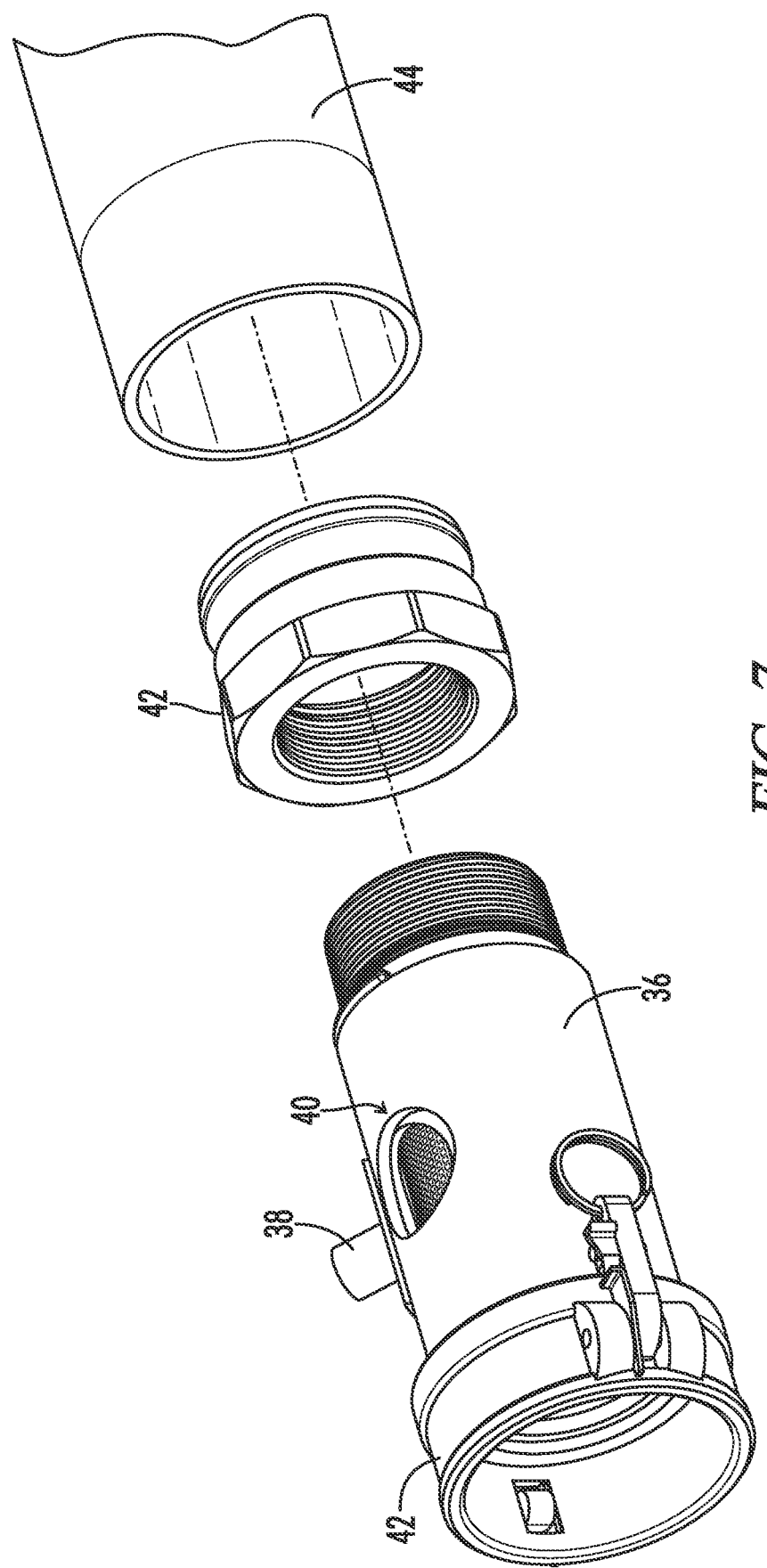
FIG. 7 illustrates a side perspective, partially exploded view of the coupler and hose of FIG. 6.
Figure 8:
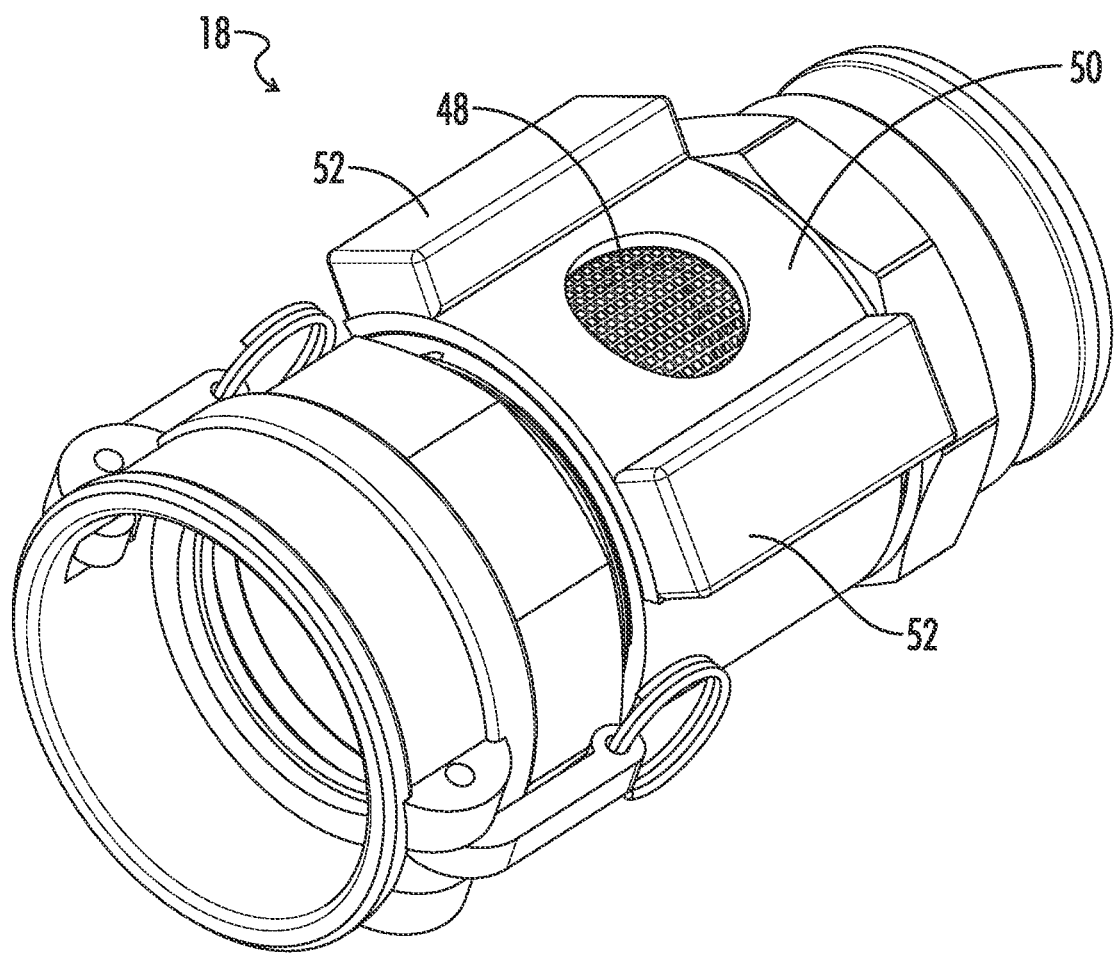
FIG. 8 illustrates a side perspective view of a coupler of another embodiment of the present invention.
Figure 9:
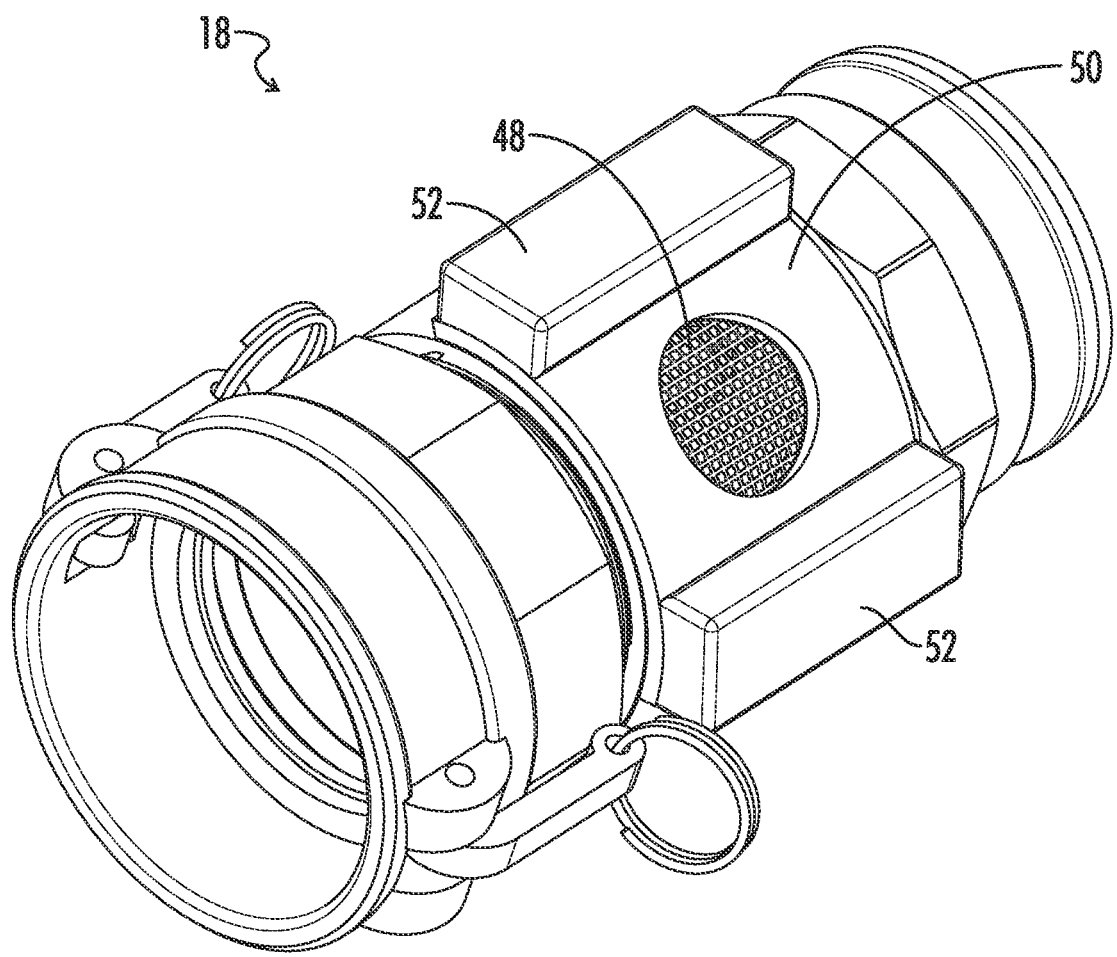
FIG. 9 illustrates another side perspective view of the coupler of FIG. 8.
Figure 10:
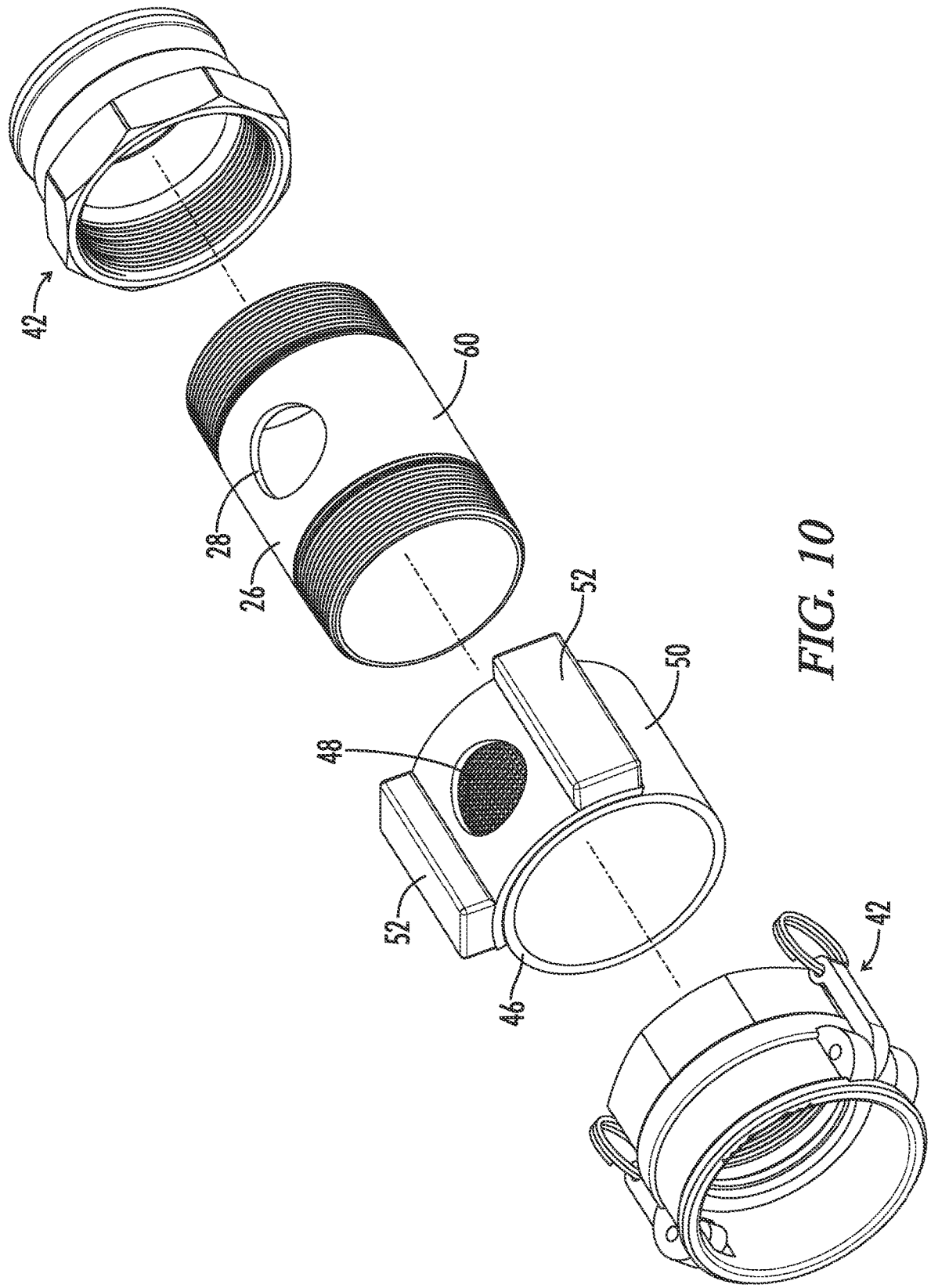
FIG. 10 illustrates a side perspective exploded view of the coupler of FIG. 8.
Figure 11:
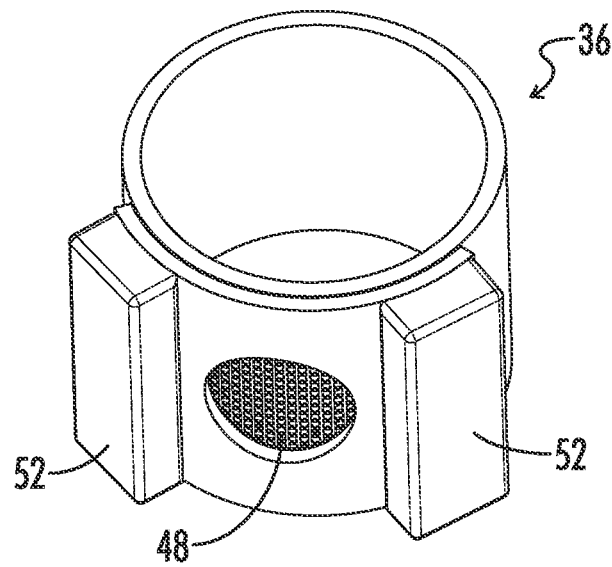
FIG. 11 illustrates another side perspective view of the moveable sleeve of the coupler of FIG. 8

Optionally, at least one of the coupler open rear end 22 and the coupler open forward end 20 comprises a coupler fastener 42. For example, at least one of the coupler open rear end 22 and the coupler open forward end 20 comprises a cam lock, as shown in FIGS. 6-7. Cam locks are known in the art and are described in, for example, U.S. Pat. No. 6,290,267, the entire contents of which are incorporated herein by reference. For example, in the embodiment of FIGS. 8-12. the coupler fastener is 42 may be attached to the internal tube 60 via mating threads.

Optionally, in either embodiment, the coupler front 20 and rear ends 22 may be connected to the source outlet 16 and destination inlet 32 using hoses 44. For example, step f) may comprise connecting the coupler open front end 20 to the source outlet 16 and/or the coupler open rear end 22 to the destination inlet 32 using one or more hoses 44. More particularly, the coupler open front end 20 may be connected to a first hose 44 that is connected to the source outlet 16 and the coupler open rear end 22 may be connected to a second hose 44 that is connected to the destination inlet 32.

Optionally, the pump 34 is a pneumatic pump. Optionally, the destination container 14 is a vacuum tank.

| Part List | |
|---|---|
| Material Transfer System | 10 |
| Source Container | 12 |
| Destination Container | 14 |
| Source Outlet | 16 |
| Coupler | 18 |
| Coupler Front End | 20 |
| Coupler Rear End | 22 |
| Coupler Interior | 24 |
| Coupler Sidewall | 26 |
| Coupler Sidewall Opening | 28 |
| Screen | 30 |

-continued

| Part List | |
|---|---|
| Destination Inlet | 32 |
| Pump | 34 |
| Moveable Sleeve | 36 |
| Handle | 38 |
| Sleeve Opening | 40 |
| Coupler Fastener | 42 |
| Hose | 44 |
| Sleeve tube | 46 |
| Filter | 48 |
| Outer collar | 50 |
| Outer collar protrusion | 52 |
| Sleeve tube opening | 56 |
| Outer collar opening | 57 |
| Sleeve Fastener | 58 |
| Coupler internal tube | 60 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about", and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of introducing air to aid the transfer of a load from a source container to a destination container comprising the steps of:
    a) providing a source container comprising a load;
    b) providing a source outlet in gaseous communication with the source container;
    c) providing a coupler having an open front end, an open rear end, a length extending from the open front end to the open rear end, a generally hollow interior extending from the open front end to the open rear end, a sidewall, at least one opening in the sidewall between the open front end and the open rear end and configured to allow air to enter the generally hollow interior, and a screen configured to cover the opening, wherein the coupler further comprises a moveable sleeve configured to rotate relative to the sidewall and at least partially cover the at least one opening, wherein the sleeve opening has an open position in which the sleeve opening is aligned with the sidewall opening and the sleeve does not cover the sidewall opening and a closed position in which the sleeve opening is not aligned with the sidewall opening and the sleeve at least partially covers the sidewall opening, wherein the moveable sleeve is comprised of a sleeve tube that encircles the sidewall and an outer collar that at least partially encircles the sleeve tube, wherein the sleeve opening extends through the sleeve tube and the outer collar, wherein the sleeve tube comprises a sleeve tube opening, wherein the outer collar comprises an outer collar opening, wherein the sleeve opening and the outer collar opening are aligned and further wherein the screen is sandwiched between the sleeve tube opening and the outer collar opening;

d) providing a destination container;

e) providing a destination inlet in gaseous communication with the destination container;

f) connecting the coupler open front end to the source outlet and the coupler open rear end to the destination inlet; and g) using a pump to transfer the load from the source container, through the source outlet, through the generally hollow interior of the coupler, through the destination inlet and into the destination container.

2. The method of claim 1 wherein the outer collar comprises a protrusion extending away from the sleeve tube.

3. The method of claim 1 wherein the coupler further comprises an internal tube comprising the sidewall, wherein the internal tube is encircled by the sleeve tube, and further wherein the internal tube is comprised of steel and the sleeve tube and the outer collar are comprised of plastic.

4. The method of claim 1 wherein the outer collar is a partial cylinder.

5. The method of claim 1 wherein the coupler further comprises a fastener removably attaching the outer collar to the sleeve tube.

6. The method of claim 1 wherein the coupler further comprises a cam lock attached to the internal tube by mating threads.

7. The method of claim 6 wherein the cam lock is located at the coupler forward end and/or coupler rear end and further wherein the cam lock removably attaches the coupler to the source outlet and/or destination inlet after step f).

8. The method of claim 1 wherein step g) comprises using the pump to create an air pressure gradient between the source container and the destination container in which the pressure is lower in the destination container than in the source container, the pressure gradient causing the load to transfer from the source container, through the source outlet, through the generally hollow interior of the coupler, through the destination inlet, and into the destination container.

9. The method of claim 8 further comprising drawing air through the at least one opening in the sidewall during step g).

10. The method of claim 1 wherein the at least one opening is between about 2 inches and about 3 inches in width.

11. The method of claim 1 wherein the pump is located rearwardly relative to the coupler open rear end.

12. The method of claim 1 wherein the pump is a pneumatic pump.

13. The method of claim 1 wherein the destination container is a vacuum tank.

14. The method of claim 1 wherein the load comprises pellets.

* * * * *